United States Patent
Gunturi et al.

(10) Patent No.: US 11,748,573 B2
(45) Date of Patent: Sep. 5, 2023

(54) SYSTEM AND METHOD TO QUANTIFY SUBJECT-SPECIFIC SENTIMENT

(71) Applicant: Tata Consultancy Services Limited, Mumbai (IN)

(72) Inventors: Sitarama Brahmam Gunturi, Hyderabad (IN); Pranavi Sura, Hyderabad (IN); Brajesh Singh, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 153 days.

(21) Appl. No.: 17/122,712

(22) Filed: Dec. 15, 2020

(65) Prior Publication Data

US 2021/0216721 A1      Jul. 15, 2021

(30) Foreign Application Priority Data

Dec. 16, 2019   (IN) .............................. 201921052179

(51) Int. Cl.
*G06F 40/30*     (2020.01)
*G06F 40/284*    (2020.01)
(Continued)

(52) U.S. Cl.
CPC ............ *G06F 40/30* (2020.01); *G06F 40/284* (2020.01); *G06F 40/289* (2020.01); *G06N 3/08* (2013.01)

(58) Field of Classification Search
CPC ........ G06F 40/00; G06F 40/20; G06F 40/205; G06F 40/211; G06F 40/279;
(Continued)

(56) References Cited

U.S. PATENT DOCUMENTS 10,002,129 B1 *  6/2018  D'Souza ............... G06F 40/289
10,460,028 B1 * 10/2019  Flann .................... G06F 40/211
(Continued)

FOREIGN PATENT DOCUMENTS

CN    106528533 A    3/2017
CN    106599933 A    4/2017
(Continued)

OTHER PUBLICATIONS

Explosion AI, "spaCy 101: Everything you need to know", Archived May 1, 2019, Explosion AI. (Year: 2019).*

*Primary Examiner* — Andrew C Flanders
*Assistant Examiner* — Alexander Joongie Kim
(74) *Attorney, Agent, or Firm* — Finnegan, Henderson, Farabow, Garrett & Dunner LLP

(57) ABSTRACT

This disclosure relates to a system and method for quantitative measure of subject specific sentiment analysis of a text input. The text input comprises subjects and objects. The text input is tokenized, and each word of the tokenized text input is tagged based on a part-of-speech (POS) and a universal dependency tag. A universal dependency tag tree is prepared based on dependency tags. Further, the subjects and objects are identified using a subject-verb-object (SVO) detection. The universal dependency tree is analyzed for each identified subject to determine a token dependency of the subject. The identified subject is quantified using a deep learning-based sentiment analyzer and finally a sentiment score is recommended for the subject using a probability score and a class score is assigned to the subject.

11 Claims, 3 Drawing Sheets

(51) Int. Cl.
    *G06F 40/289*      (2020.01)
    *G06N 3/08*        (2023.01)

(58) Field of Classification Search
    CPC ...... G06F 40/284; G06F 40/289; G06F 40/30;
                G06F 40/35; G06N 3/02; G06N 3/08;
                                          G06N 20/00
    See application file for complete search history.

(56) References Cited

U.S. PATENT DOCUMENTS

| | | | | |
|---|---|---|---|---|
| 10,467,344 | B1* | 11/2019 | Jade | G06F 40/205 |
| 11,531,998 | B2* | 12/2022 | Kopikare | G06N 5/046 |
| 2014/0129213 | A1* | 5/2014 | Kimelfeld | G06F 40/211 |
| | | | | 704/9 |
| 2015/0186790 | A1* | 7/2015 | Ehlen | G06Q 30/02 |
| | | | | 707/750 |
| 2020/0004816 | A1* | 1/2020 | Kieser | G06F 40/30 |
| 2020/0159833 | A1* | 5/2020 | Natesan | G10L 21/06 |
| 2020/0410054 | A1* | 12/2020 | Kumar | G06N 3/08 |

FOREIGN PATENT DOCUMENTS

| | | | |
|---|---|---|---|
| CN | 106776581 | A | 5/2017 |
| CN | 107862087 | A | 3/2018 |
| CN | 108733644 | A | 11/2018 |

* cited by examiner

SYSTEM AND METHOD TO QUANTIFY SUBJECT-SPECIFIC SENTIMENT

CROSS-REFERENCE TO RELATED APPLICATIONS AND PRIORITY

This U.S. patent application claims priority under 35 U.S.C. § 119 to Indian application No. 201921052179, filed on Dec. 16, 2019. The entire content of the abovementioned application is incorporated herein by reference.

TECHNICAL FIELD

The disclosure herein generally relates to a field of sentiment analysis of a text input and, more particularly, a system and method for a quantitative measure of a subject-specific sentiment analysis of a text input.

BACKGROUND

The amount of data generated each year is growing exponentially because of digitalization of almost every industry. Majority of data available is unstructured in the form of text and images. Various natural language processing (NLP) techniques have been used to process the unstructured data and get the useful information out of that. Over the past few years, many deep learning-based approaches have been introduced to provide efficient solutions to problems in natural language processing (NLP) such as text classification, sentiment analysis, text summarization, topic discovery and so on.

Existing solutions have been reported in the literature to measure the sentiment of the text and they can be categorized as qualitative and quantitative approaches. Vader based approaches are quantitative approaches that provide quantitative measure of the sentiment of the text. Machine learning based approaches classify the text messages into predefined set of classes, such as strong positive, positive, neutral, negative, and strong negative. Both these approaches do not deal with sentiment related to the individual subjects of the text.

SUMMARY

Embodiments of the present disclosure provides technological improvements as solutions to one or more of the above-mentioned technical problems recognized by the inventors in conventional systems.

In one aspect, a processor-implemented method for a quantitative measure of a subject-specific sentiment analysis of a text input. Herein, the text input comprises one or more subjects and one or more objects. It would be appreciated that the sentiment of each subject is quantified separately then an overall sentiment of the text input.

The method comprises one or more steps as follows. Herein, at least one text input is received. The received at least one text input comprises at least one subject and at least one object. It is to be noted that in absence of at least one object in the received text input, a first adjective present in the received text input would be considered as an object of the received text input. The received text input is tokenized using a predefined word delimiter. Each tokenized word is tagged based on a part-of-speech (POS) and a universal dependency tag. Further, at least one subject and at least one object is identified using a subject-verb-object (SVO) detection model. It would be appreciated that, wherein more than one subject present in the received text, each subject of the received text input is identified and tagged.

Further, a tree of the universal dependency tagged words is prepared and analyzed for identified subject to determine a token dependency of the identified subject using a predefined list of tuples of each identified word and a dependence tag of each tuple. Extracting at least one phrase corresponding to the identified subject and represent the extracted at least one phrase in a numerical vector. It is to be noted that wherein more than one subject is present in the received text input, an index will be prepared using the universal dependency tag tree for each identified subject and corresponding at least one object of the received text input. Further, the identified subject is quantified using a pre-trained deep learning-based sentiment analyzer and finally recommending a sentiment score for the quantified subject along with a sentiment score of the received text input using a probability score of the deep learning-based sentiment analyzer. A predefined class score is also assigned to the quantified subject.

In another aspect, a system is configured for a quantitative measure of a subject-specific sentiment analysis of a text input. It would be appreciated that the sentiment of each subject is quantified separately then an overall sentiment of the text input. The system comprising at least one memory storing a plurality of instructions and one or more hardware processors communicatively coupled with at least one memory. The one or more hardware processors are configured to execute one or more modules comprises of a receiving module, a tokenization module, a tagging module, an identification module, an analyzing module, a quantification module, and a recommendation module.

The receiving module of the system is configured to receive at least one text input comprising at least one subject and at least one object. It is to be noted that in absence of at least one object in the received text input, a first adjective present in the received text input would be considered as an object of the received text input. The tokenization module of the system is configured to tokenize the received text input based on a predefined word delimiter. Further, each word of the tokenized text input is tagged at a tagging module based on a part-of-speech (POS) and a universal dependency tag. The identification module of the system is configured to identify at least one subject and at least one object of the tokenized text input using a subject-verb-object (SVO) detection model. It would be appreciated that, wherein more than one subject present in the received text, each subject of the received text input is identified and tagged. A universal dependency tag tree is prepared from the identified subjects.

Further, the analyzing module of the system is configured to analyze the universal dependency tag tree to determine token dependency of the identified subject using a predefined list of tuples of each identified word and a dependence tag of each tuple. At least one phrase corresponding to the identified subject is extracted and represented in a numerical vector. It is to be noted that wherein more than one subject is present in the received text input, an index will be prepared using the universal dependency tag tree for each identified subject and corresponding at least one object of the received text input.

The quantification module is configured to quantify the identified subject using a deep learning-based sentiment analyzer and the recommendation module is configured to recommend a sentiment score for the quantified subject along with a sentiment score of the received text input using a probability score of the deep learning-based sentiment analyzer. Further, a predefined class score is assigned to the quantified subject.

In yet another embodiment, a non-transitory computer readable medium storing one or more instructions which when executed by a processor on a system cause the processor to perform method is provided. The method comprises one or more steps as follows. Herein, at least one text input is received. The received at least one text input comprises at least one subject and at least one object. It is to be noted that in absence of at least one object in the received text input, a first adjective present in the received text input would be considered as an object of the received text input. The received text input is tokenized using a predefined word delimiter. Each tokenized word is tagged based on a part-of-speech (POS) and a universal dependency tag. Further, at least one subject and at least one object is identified using a subject-verb-object (SVO) detection model. It would be appreciated that, wherein more than one subject present in the received text, each subject of the received text input is identified and tagged.

Further, a tree of the universal dependency tagged words is prepared and analyzed for identified subject to determine a token dependency of the identified subject using a predefined list of tuples of each identified word and a dependence tag of each tuple. Extracting at least one phrase corresponding to the identified subject and represent the extracted at least one phrase in a numerical vector. It is to be noted that wherein more than one subject is present in the received text input, an index will be prepared using the universal dependency tag tree for each identified subject and corresponding at least one object of the received text input. Further, the identified subject is quantified using a pretrained deep learning-based sentiment analyzer and finally recommending a sentiment score for the quantified subject along with a sentiment score of the received text input using a probability score of the deep learning-based sentiment analyzer. A predefined class score is also assigned to the quantified subject.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The embodiments herein provide a method and a system for a quantitative measure of a subject-specific sentiment from input text. Herein, the system and method to identify each subject and the related phrases and the sentiment is quantitatively measured at the subject level along with at a text input level.

Figure 1:
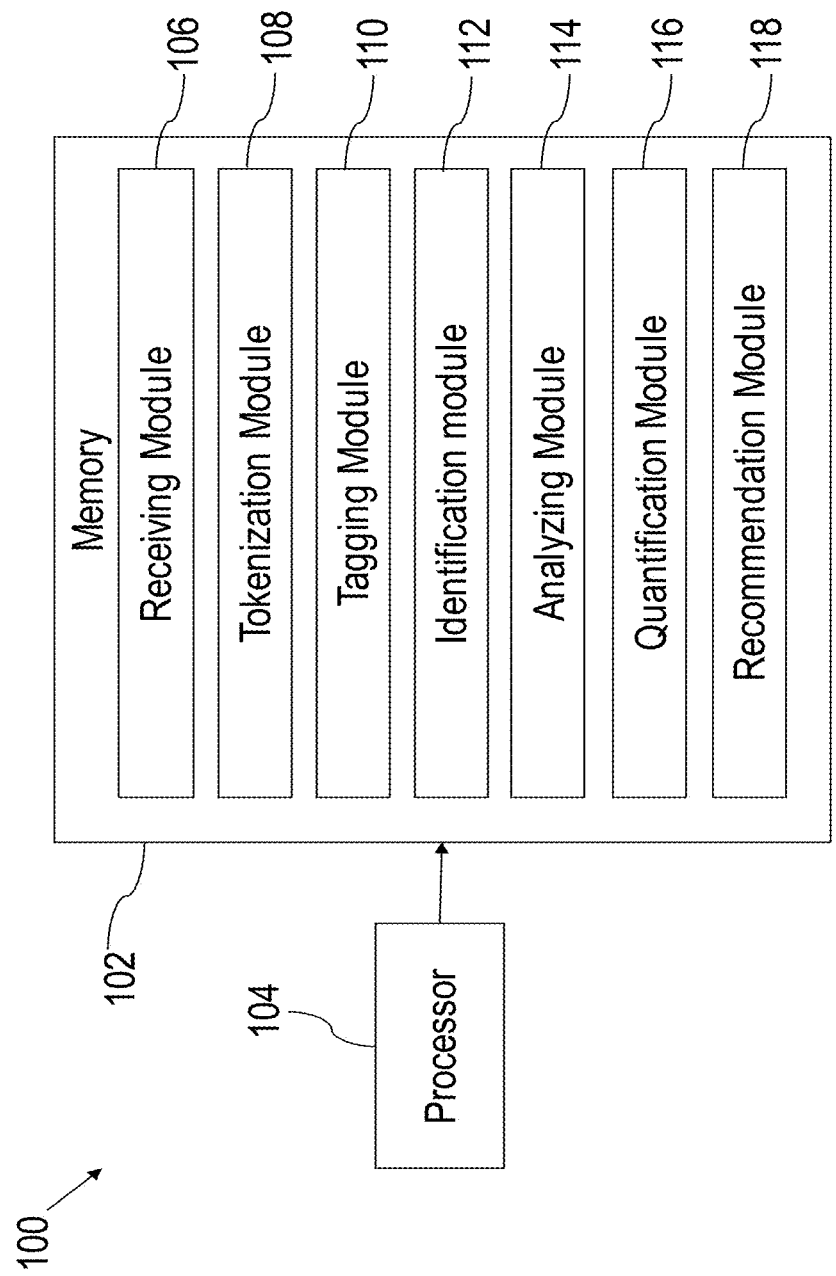
FIG. 1 illustrates a system for a quantitative measure of a subject-specific sentiment analysis of an unstructured form of texts, in accordance with some embodiments of the present disclosure.
Figure 2:
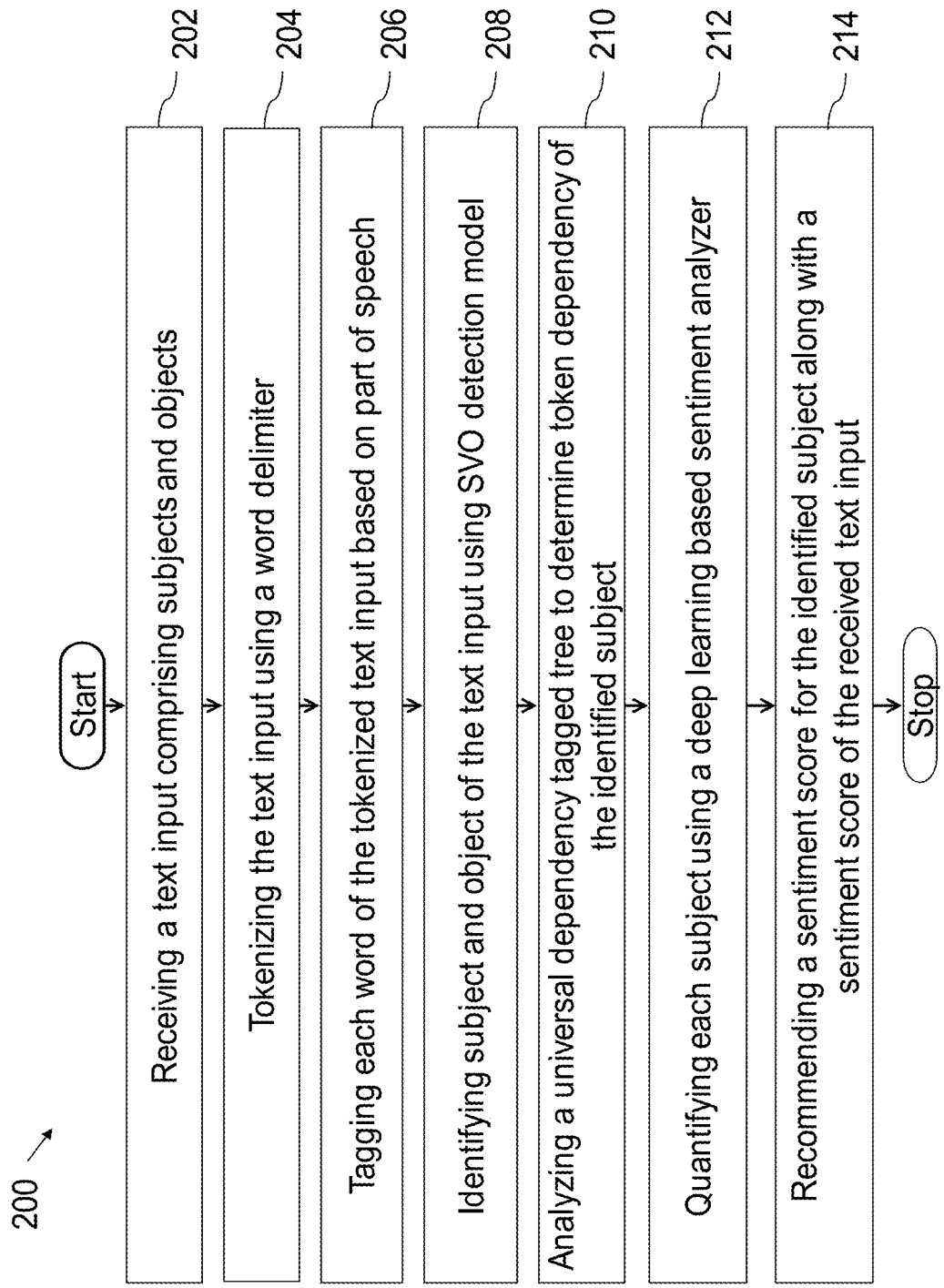
FIG. 2 is a flow diagram to illustrate a method for a quantitative measure of a subject-specific sentiment analysis of a text input, in accordance with some embodiments of the present disclosure.
Figure 3:
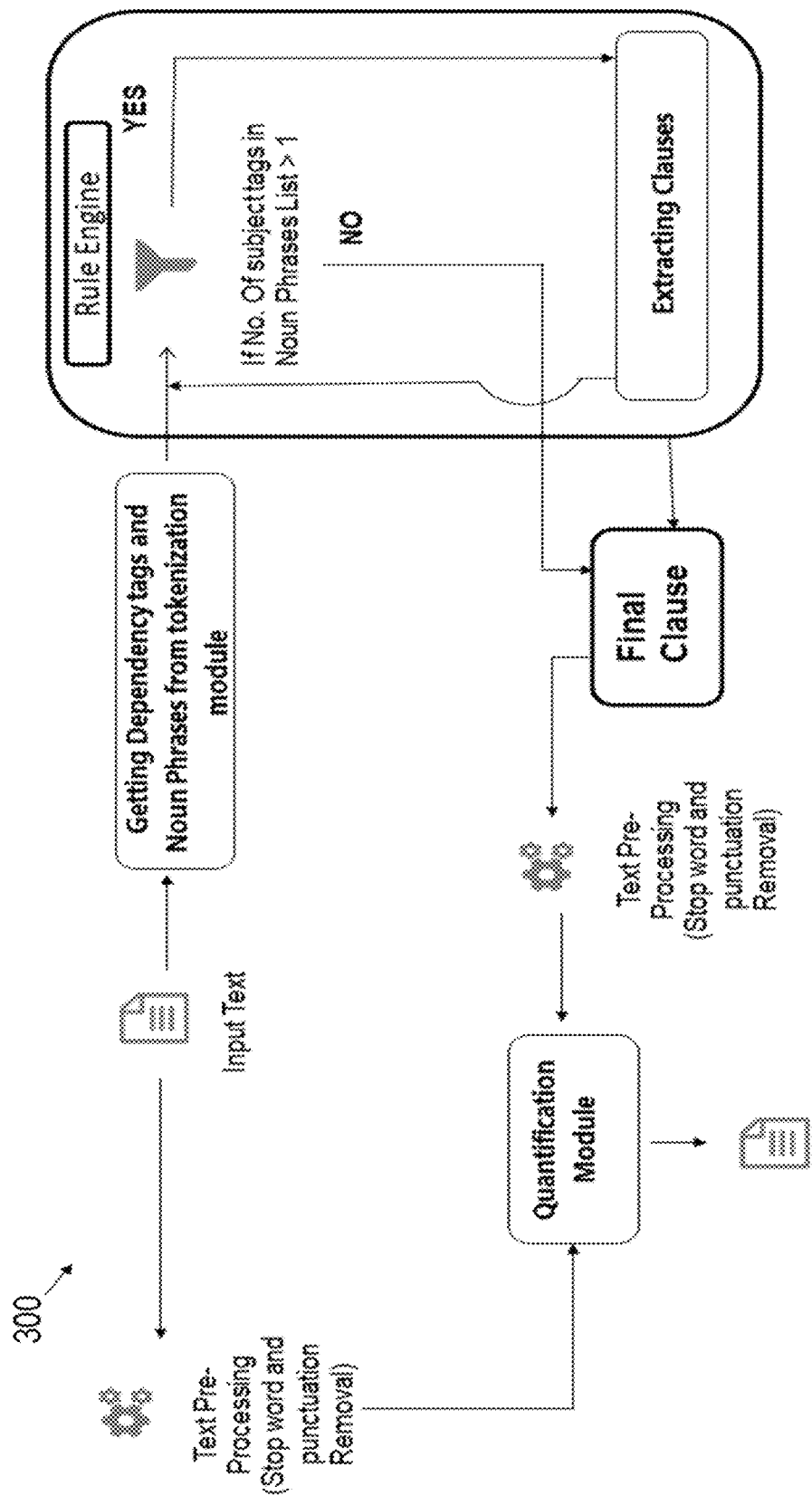
FIG. 3 is a functional block diagram of the system to measure a sentiment score to a text input, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates a system (100) for a quantitative measure of a subject-specific sentiment analysis of an unstructured form of texts. In the preferred embodiment, the system (100) comprises at least one memory (102) with a plurality of instructions and one or more hardware processors (104) which are communicatively coupled with the at least one memory (102) to execute modules therein.

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102). Further, the system comprises a receiving module (106), a tokenization module (108), a tagging module (110), an identification module (112), an analyzing module (114), a quantification module (116), and a recommendation module (118).

In the preferred embodiment of the disclosure, the receiving module (106) of the system (100) is configured to receive at least one text input comprising at least one subject and at least one object word. Herein, the text input is received from a predefined internet source of information or a predefined file in a form of natural language. The predefined internet source of information includes a social media platform, and a consumer forum. It is to be noted that in absence of the at least one object in the received text input, a first adjective is considered as an object of the received text input.

In the preferred embodiment of the disclosure, the tokenization module (108) of the system (100) is configured to tokenize the received at least one text input based on a predefined word delimiter. The predefined word delimiter includes a comma, a space, and a semicolon. The space is used to delimit words whereas the comma and semicolon are used to separate text input.

In the preferred embodiment of the disclosure, the tagging module (110) of the system is configured to tag each word of the tokenized at least one text input based on a part-of-speech (POS) and a universal dependency tag. A universal dependency tag tree is identified from the each tagged word with the universal dependency tag.

In the preferred embodiment of the disclosure, the identification module (112) of the system (100) is configured to identify at least one subject and at least one object of the at least one tokenized text input using a subject-verb-object (SVO) detection model. The identified subject and objects are classified in noun chunks. It is to be noted that in presence of more than one subject in the received text input, an index is prepared using the universal dependency tag tree for each identified subject and corresponding at least one object of the received text input.

In one aspect, when the text input is tokenized using the predefined word limiter and a list of tuples of each word of the text input is obtained. Further, a list of noun chunks present in the text input is also identified using a subject-verb-object detection model. The list of noun chunks is analyzed to identify a number of subjects and a number of objects in the text input. If the number of subjects is more than one, then first subject word of the text input is marked with subject tag from the list of noun chunks. Following the first subject word, a first object is identified from a token dependency list and marked with an object tag. However, if in the text input the identified first object word is followed with a word having an object tag or an adjective dependency tag then the first word with object tag is changed with the following word as an object tag of the text input.

In another aspect, after getting the dependency tags and noun phrases from the input text, a rule engine is calibrated to use the dependency tags and the noun phrases to extract clauses relevant to each identified subject. If the number of subjects in the noun chuck is more than one, then first word with subject tag from the noun chunk list and marked as a subject word. Further, the system identifies an object word from the noun chunk and prepares an index of the corresponding subject and object from the token list and get a resultant clause. The same step is repeated for each identified subject in the noun chunk list.

In one example, wherein an input text to the system is "I ordered the lemon raspberry ice cocktail, which was also incredible". The input text is tokenized at tokenization module of the system and at least one subject and object are identified at the identification module. Herein, one subject 'I' and one object 'the lemon raspberry ice cocktail' is identified for a quantitative measure of a subject-specific sentiment analysis.

In another example, wherein an input text to the system is "the story is lame, not interesting and never really explains the sinister origins of the puppets". The input text comprises one subject 'the story' and multiple objects 'the sinister origin' and 'the puppets' for a quantitative measure of a subject-specific sentiment analysis.

In another embodiment, wherein the received text input does not contain a word with an object tag then a first adjective word is identified with an object tag. Further, wherein more than one subject is present in the received text input, an index will be prepared using the universal dependency tag tree for each identified subject and corresponding at least one object of the received text input.

In another example, wherein an input to the system is "the cashew cream sauce was bland, and the vegetables undercooked". The input text comprises multiple subjects without any object. The subject includes 'the cashew cream sauce' and 'the vegetables'. Therefore, a first adjective in the input text is considered as an object. Herein, the first adjective is 'bland' to be taken as an object of the input text.

In the preferred embodiment of the disclosure, the analyzing module (114) of the system (100) is configured to analyze the universal dependency tag tree for the identified subject to determine a token dependency of the identified subject using a dependency parser. Extracting at least one phrase corresponding to the identified at least one subject from the determined token dependency and represent the extracted at least one phrase in a numerical vector.

It would be appreciated that a dependency parser analyzes a grammatical structure of the text input, establishing a relationship between a headword and a word, which modify the headword. The dependency parser supports a universal dependency scheme. The universal dependency is a framework for a consistent annotation of grammar across different human languages. It would be appreciated that different dependency tags are present, which describes the relationship of a word with respect to its neighboring words.

In the preferred embodiment of the disclosure, the quantification module (116) of the system (100) is configured to quantify the identified at least one subject using a deep learning based a sentiment analyzer and a predefined class score of the at least one subject. The deep learning-based sentiment analyzer is trained on a dataset using a convolutional neural network (CNN) model. Herein, one or more noun phrases of each subject are converted to word embedding and are given to a pre-trained CNN for sentiment determination. Output of the CNN model is a list of probability score for each class. The probability scores along with the pre-defined sentiment score range is used to calculate the sentiment score of the input text.

It is to be noted that the CNN model comprises an input layer, an embedding layer, a plurality of convolution layers, a pooling layer and a dense layer. The input layer takes the sequence of tokens of the received input text as input to the CNN model. The embedding layer is a look-up table, wherein each tokenized word of the received text input is mapped to a trainable feature vector. The plurality of convolution layers is the core building block of the CNN model. The plurality of convolution layers comprises of a set of independent learnable filters. Each of the learnable filters is independently convolved with the embedding matrix producing different feature maps. The pooling layer progressively reduces the spatial size of the representation to reduce the number of parameters and computation in the network. Pooling layer operates on each feature map independently. Finally, after several convolutional and max pooling layers, the high-level reasoning in the neural network is done through a fully connect layer. Neurons in a fully connected layer have connections to all activations in the max-pooling layer, as seen in regular neural networks. Fully connected layer generates an output equal to the number of classes a user defines.

In the preferred embodiment of the disclosure, the recommendation module (118) of the system (100) is configured to recommend a sentiment score for the quantified subject and a sentiment score of the received text input using a probability score of the deep learning-based sentiment analyzer. Further, assigning a predefined sentiment class using the recommended sentiment score to the quantified at least one subject and the sentiment score to the received text input.

In one example, wherein an input text to the rule engine of the system is "the cashew cream sauce was bland, and the vegetables were undercooked". The output of the rule engine is "the cashew cream sauce was bland", first clause and "the vegetables were undercooked" secs and clause of the input text. Further, the input to the CNN model is first clause "the cashew cream sauce was bland". The output of the CNN model will be a list of probability scores corresponding to each sentiment class $[P_1, P_2, P_3, P_4, P_5]$. Therefore, a sentiment score of the identified subject and a sentiment score of the received text input is calculated.

$$\sum_{i=1}^{5} Si*Pi$$

wherein, $S_i$ is a predefined class score {−1.0, −0.5, 0, 0.5, 1.0} and $P_i$ is the probability score given by the CNN model at an output layer. Therefore, the sentiment score of the given clause is −0.98. It is repeated for second clause and the sentiment score is −0.88. Once the sentiment score for each clause is quantified, the corresponding subject of each clause is classified as a positive or negative subject of the input text. Further, an overall sentiment score is calculated for the complete input text using the sentiment analyzer. Herein, the overall sentiment score for the input text is −0.99.

Referring FIG. 2, a processor-implemented method (200) for quantitative measure of subject wise sentiment analysis of unstructured form of texts. The method comprises one or more steps as follows.

Initially, at the step (202), a text input is received at a receiving module of (106) of the system (100). The text input comprises at least one subject and at least one object word. Herein, the text input is received from a predefined internet source of information or a predefined file in a form of natural language. The predefined internet source of information includes a social media platform, and a consumer forum. It is to be noted that in absence of the at least one object in the received text input, a first adjective is considered as an object of the received text input.

In the preferred embodiment of the disclosure, at the next step (204), the received at least one text input is tokenized at a tokenization module (108) of the system (100) using a predefined word delimiter model. Each word of the tokenized text input is tagged based on a part-of-speech (POS) and a universal dependency tag.

In the preferred embodiment of the disclosure, at the next step (206), each word of the tokenized at least one text input is tagged based on a part-of-speech (POS) and a universal dependency tag. Further, a universal dependency tag tree is identified from the each tagged word with the universal dependency tag.

In the preferred embodiment of the disclosure, at the next step (208), at least one subject and at least one object is identified at an identification module (110) of the system (100) using a subject-verb-object (SVO) detection model. The identified subject and objects are classified in noun chunks.

Referring FIG. 3, wherein at least one text input is tokenized using the predefined word limiter and a list of tuples of each word of the text input is obtained. Further, a list of noun chunks present in the text input is also identified using subject-verb-object detection model. The list of noun chunks is analyzed to identify a number of subjects and a number of objects in the text input. If the number of subjects is more than one, then first subject word of the text input is marked with subject tag from the list of noun chunks.

Furthermore, to measure sentiment score of the text input excluding the sentiment score for each of the identified subjects present in the text input, the system pre-processes the received text input using the word delimiter and quantifying using a deep learning-based sentiment analyzer. The system recommends a sentiment score to the received text input using a probability score of the deep learning-based sentiment analyzer.

In the preferred embodiment of the disclosure, at the next step (210), a tree of the universal dependency tagged words are analyzed at an analyzing module (112) of the system (100) for identified at least one subject to determine a token dependency of the identified at least one subject using a dependency parser. Extracting at least one phrase corresponding to the identified subject and represent the extracted at least one phrase in a numerical vector.

In the preferred embodiment of the disclosure, at the next step (212), the identified at least one subject is quantified at a quantification module (114) of the system (100) using a deep learning-based sentiment analyzer. The deep learning-based sentiment analyzer is trained on a dataset using a convolutional neural network (CNN) model. Herein, one or more noun phrases of each subject are converted to word embedding and are given to a pre-trained CNN for sentiment determination. Output of the CNN model is a list of probability score for each class. The probability scores along with the pre-defined sentiment score range is used to calculate the sentiment score of the input text.

In the preferred embodiment of the disclosure, at the last step (214), recommending a sentiment score for the quantified subject along with a sentiment score of the received text input at a recommendation module (116) of the system (100) using the probability score of the deep learning-based sentiment analyzer, Further, assigning a predefined sentiment class using the recommended sentiment score to the quantified at least one subject and the sentiment score to the received text input.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with quantitative measure of subject wise sentiment analysis of unstructured form of texts. Most of the existing solutions have been reported to measure the sentiment of the text and they can be categorized as qualitative and quantitative approaches. Vader based approaches are quantitative approaches that provide quantitative measure of the sentiment of the text. Machine learning based approaches classify the text messages into predefined set of classes, such as strong positive, positive, neutral, negative and strong negative. Both these approaches do not deal with sentiment related to the individual subjects of the text.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method (200) comprising:

receiving (202), via one or more hardware processors, at least one text input having at least one subject and at least one object;

tokenizing (204), via the one or more hardware processors, the received at least one text input using a predefined word delimiter;

tagging (206), via the one or more hardware processors, each word of the tokenized at least one text input based on a part-of-speech (POS) and a universal dependency tag, wherein a universal dependency tag tree is identified from the each tagged word with the universal dependency tag;

identifying (208), via the one or more hardware processors, at least one subject and at least one object from the tagged each word of the at least one text input using a subject-verb-object (SVO) detection model, wherein the identified at least one subject and the at least one object is classified in noun chunks;

analyzing, via the one or more hardware processors, the noun chunks to identify a number of subjects and a number of objects in the at least one text input, wherein a first subject word of the at least one text input is marked with a subject tag when the number of subjects is more than one and a first object word is marked with an object tag, and wherein, if in the at least one text input the first object word is followed with a word having an object, then the first object word with the object tag is changed with the following word as an object tag of the at least one text input;

analyzing (210), via the one or more hardware processors, the universal dependency tag tree for the identified at least one subject to determine a token dependency of the identified at least one subject using a predefined list of tuples of each word and a universal dependence tag of each tuple using a dependency parser, wherein at least one phrase is extracted corresponding to the identified at least one subject from the determined token dependency and the extracted at least one phrase is represented in a numerical vector, and wherein the dependency parser analyzes a grammatical structure of the at least one text input, establishing a relationship between a headword and a word, which modify the headword and the dependency parser supports a universal dependency scheme where the universal dependency is a framework for a consistent annotation of grammar across different languages, and varied dependency tags are present describing relationship of each word with neighboring words, wherein after getting dependency tags and noun phrases from the input text, a rule engine is calibrated to use the dependency tags and the noun phrases to extract clauses relevant to the identified at least one subject;

quantifying (212), via the one or more hardware processors, the identified at least one subject using a pre-trained deep learning-based sentiment analyzer and a predefined class score of the at least one subject, wherein a probability score is obtained against the identified at least one subject, wherein the deep learning-based sentiment analyzer is pre-trained on a dataset using a convolutional neural network (CNN) model and one or more noun phrases of each subject are converted to word embedding and are given to the pre-trained deep learning-based sentiment analyzer for sentiment determination, wherein sentiment of the each subject in the at least one text input is quantified separately and an overall sentiment of the at least one text input is quantified, wherein the sentiment is quantitatively measured at a subject level along with at a text input level, wherein input to the CNN model is the extracted at least one phrase corresponding to the identified at least one subject and output of the CNN model is a list of probability scores for each sentiment class, wherein the CNN model comprises an input layer, an embedding layer, a plurality of convolution layers, a pooling layer and a dense layer, wherein the input layer takes a sequence of tokens of the received at least one text input as input to the CNN model, wherein the embedding layer is a look-up table, wherein each tokenized word of the received at least one text input is mapped to a trainable feature vector, wherein the plurality of convolution layers comprises of a set of independent learnable filters and each of the learnable filters is independently convolved with an embedding matrix producing different feature maps, and wherein the pooling layer operates on each feature map independently;

calculating a sentiment score of to the quantified subject using an equation:

$$\sum_{i=1}^{5} Si*Pi$$

wherein Si is the predefined class score ranging from −1.0 to 1.0 and Pi is the probability score given by the CNN model at an output layer, and wherein the sentiment score is computed for the clause and the sentiment score calculation is repeated for subsequent clause extracted corresponding to the identified at least one subject and once the sentiment score for each phrase is quantified, the corresponding subject of each phrase is classified as a positive subject or a negative subject of the at least one text input; and recommending (214), via the one or more hardware processors, the sentiment score to the quantified subject along with a sentiment score to the received text input based on the quantified at least one subject and the probability score of the identified at least one subject.

2. The processor-implemented method (200) of claim 1, wherein an index is prepared in presence of more than one subject in the received text input, using the universal dependency tag tree for each identified subject and corresponding at least one object of the received text input.

3. The processor-implemented method (200) of claim 1, wherein a first adjective is considered as an object of the received text input in absence of at least one object in the received text input.

4. The processor-implemented method (200) of claim 1, wherein the noun chunks comprise the identified at least one subject and at least one object of the received text input.

5. The processor-implemented method (200) of claim 1, wherein a predefined sentiment class is assigned using the recommended sentiment score to the quantified at least one subject and the sentiment score to the received text input.

6. A system (100) comprising:
at least one memory (102) storing a plurality of instructions;
one or more hardware processors (104) communicatively coupled with the at least one memory (102), wherein the one or more hardware processors (104) are configured to:

receive at least one text input having at least one subject and at least one object;

tokenize the received at least one text input using a predefined word delimiter;

tag each word of the tokenized at least one text input based on a part-of-speech (POS) and a universal dependency tag, wherein a universal dependency tag tree is identified from the each tagged word with the universal dependency tag;

identify at least one subject and at least one object from the tagged each word of the at least one text input using a subject-verb-object (SVO) detection model, wherein the identified at least one subject and the at least one object is classified in noun chunks;

analyze the noun chunks to identify a number of subjects and a number of objects in the at least one text input, wherein a first subject word of the at least one text input is marked with a subject tag when the number of subjects is more than one and a first object word is marked with an object tag, and wherein, if in the at least one text input the first object word is followed with a word having an object, then the first object word with the object tag is changed with the following word as an object tag of the at least one text input;

analyze the universal dependency tag tree for the identified at least one subject to determine a token dependency of the identified at least one subject using a predefined list of tuples of each word and a universal dependence tag of each tuple using a dependency parser, wherein at least one phrase is extracted corresponding to the identified at least one subject from the determined token dependency and the extracted at least one phrase is represented in a numerical vector, and wherein the dependency parser analyzes a grammatical structure of the at least one text input, establishing a relationship between a headword and a word, which modify the headword and the dependency parser supports a universal dependency scheme where the universal dependency is a framework for a consistent annotation of grammar across different languages, and varied dependency tags are present describing relationship of each word with neighboring words, wherein after getting dependency tags and noun phrases from the input text, a rule engine is calibrated to use the dependency tags and the noun phrases to extract clauses relevant to the identified at least one subject;

quantify the identified at least one subject using a pre-trained deep learning-based sentiment analyzer and a predefined class score of the at least one subject, wherein a list of probabilities is obtained against the identified at least one subject, wherein the deep learning-based sentiment analyzer is pre-trained on a dataset using a convolutional neural network (CNN) model and one or more noun phrases of each subject are converted to word embedding and are given to the pre-trained deep learning-based sentiment analyzer for sentiment determination, wherein sentiment of the each subject in the at least one text input is quantified separately and an overall sentiment of the at least one text input is quantified, wherein the sentiment is quantitatively measured at a subject level along with at a text input level, wherein input to the CNN model is the extracted at least one phrase corresponding to the identified at least one subject and output of the CNN model is a list of probability scores for each sentiment class, wherein the CNN model comprises an input layer, an embedding layer, a plurality of convolution layers, a pooling layer and a dense layer, wherein the input layer takes a sequence of tokens of the received at least one text input as input to the CNN model, wherein the embedding layer is a look-up table, wherein each tokenized word of the received at least one text input is mapped to a trainable feature vector, wherein the plurality of convolution layers comprises of a set of independent learnable filters and each of the learnable filters is independently convolved with an embedding matrix producing different feature maps, and wherein the pooling layer operates on each feature map independently;

calculate a sentiment score to the quantified subject using an equation:

$$\sum_{i=1}^{5} Si * Pi$$

wherein Si is the predefined class score ranging from −1.0 to 1.0 and Pi is the probability score given by the CNN model at an output layer, and wherein the sentiment score is computed for the clause and the sentiment score calculation is repeated for subsequent clause extracted corresponding to the identified at least one subject and once the sentiment score for each phrase is quantified, the corresponding subject of each phrase is classified as a positive subject or a negative subject of the at least one text input; and recommend the sentiment score to the quantified subject along with a sentiment score to the received text input based on the quantified at least one subject and the probability score of the identified at least one subject.

7. The system (100) of claim 6, wherein an index is prepared in presence of more than one subject in the received text input, using the universal dependency tag tree for each identified subject and corresponding at least one object of the received text input.

8. The system (100) of claim 6, wherein a first adjective is considered as an object of the received text input in absence of at least one object in the received text input.

9. The system (100) of claim 6, wherein a predefined sentiment class is assigned using the recommended sentiment score to the quantified subject and the sentiment score to the received text.

10. The system (100) of claim 6, wherein the noun chunks comprise the identified at least one subject and at least one object of the received text input.

11. A non-transitory computer readable medium storing one or more instructions which when executed by a processor on a system, cause the processor to perform method comprising:

receiving, via one or more hardware processors, at least one text input having at least one subject and at least one object;

tokenizing, via the one or more hardware processors, the received at least one text input using a predefined word delimiter;

tagging, via the one or more hardware processors, each word of the tokenized at least one text input based on a part-of-speech (POS) and a universal dependency tag, wherein a universal dependency tag tree is identified from the each tagged word with the universal dependency tag;

identifying, via the one or more hardware processors, at least one subject and at least one object from the tagged each word of the at least one text input using a subject-verb-object (SVO) detection model, wherein the identified at least one subject and the at least one object is classified in noun chunks;

analyzing, via the one or more hardware processors, the noun chunks to identify a number of subjects and a number of objects in the at least one text input, wherein a first subject word of the at least one text input is marked with a subject tag when the number of subjects is more than one and a first object word is marked with an object tag, and wherein, if in the at least one text input the first object word is followed with a word having an object, then the first object word with the object tag is changed with the following word as an object tag of the at least one text input;

analyzing, via the one or more hardware processors, the universal dependency tag tree for the identified at least one subject to determine a token dependency of the identified at least one subject using a predefined list of tuples of each word and a universal dependence tag of each tuple using a dependency parser, wherein at least one phrase is extracted corresponding to the identified at least one subject from the determined token dependency and the extracted at least one phrase is represented in a numerical vector, and wherein the dependency parser analyzes a grammatical structure of the at least one text input, establishing a relationship between a headword and a word, which modify the headword and the dependency parser supports a universal dependency scheme where the universal dependency is a framework for a consistent annotation of grammar across different languages, and varied dependency tags are present describing relationship of each word with neighboring words, wherein after getting dependency tags and noun phrases from the input text, a rule engine is calibrated to use the dependency tags and the noun phrases to extract clauses relevant to the identified at least one subject;

quantifying, via the one or more hardware processors, the identified at least one subject using a pre-trained deep learning-based sentiment analyzer and a predefined class score of the at least one subject, wherein a probability score is obtained against the identified at least one subject, wherein the deep learning-based sentiment analyzer is pre-trained on a dataset using a convolutional neural network (CNN) model and one or more noun phrases of each subject are converted to word embedding and are given to the pre-trained deep learning-based sentiment analyzer for sentiment determination, wherein sentiment of the each subject in the at least one text input is quantified separately and an overall sentiment of the at least one text input is quantified, wherein the sentiment is quantitatively measured at a subject level along with at a text input level, wherein input to the CNN model is the extracted at least one phrase corresponding to the identified at least one subject and output of the CNN model is a list of probability scores for each sentiment class, wherein the CNN model comprises an input layer, an embedding layer, a plurality of convolution layers, a pooling layer and a dense layer, wherein the input layer takes a sequence of tokens of the received at least one text input as input to the CNN model, wherein the embedding layer is a look-up table, wherein each tokenized word of the received at least one text input is mapped to a trainable feature vector, wherein the plurality of convolution layers comprises of a set of independent learnable filters and each of the learnable filters is independently convolved with an embedding matrix producing different feature maps, and wherein the pooling layer operates on each feature map independently;

calculating a sentiment score to the quantified subject using an equation:

$$\sum_{i=1}^{5} Si * Pi$$

wherein Si is the predefined class score ranging from −1.0 to 1.0 and Pi is the probability score given by the CNN model at an output layer, and wherein the sentiment score is computed for the clause and the sentiment score calculation is repeated for subsequent clause extracted corresponding to the identified at least one subject and once the sentiment score for each phrase is quantified, the corresponding subject of each phrase is classified as a positive subject or a negative subject of the at least one text input; and recommending, via the one or more hardware processors, the sentiment score to the quantified subject along with a sentiment score to the received text input based on the quantified at least one subject and the probability score of the identified at least one subject.

* * * * *